(12) United States Patent
Shinohara et al.

(10) Patent No.: US 7,574,299 B2
(45) Date of Patent: Aug. 11, 2009

(54) FUEL INJECTION CONTROL APPARATUS AND METHOD FOR INTERNAL COMBUSTION ENGINE

(75) Inventors: Toshinari Shinohara, Saitama-ken (JP); Ken Ogawa, Saitama-ken (JP); Toru Kitamura, Saitama-ken (JP); Chiho Itoga, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 9 days.

(21) Appl. No.: 12/005,320

(22) Filed: Dec. 27, 2007

(65) Prior Publication Data

US 2008/0162014 A1 Jul. 3, 2008

(30) Foreign Application Priority Data

Dec. 27, 2006 (JP) ............................. 2006-353403

(51) Int. Cl.
*F02D 41/34* (2006.01)
*G06F 19/00* (2006.01)

(52) U.S. Cl. .................... 701/104; 123/478; 123/300; 701/105

(58) Field of Classification Search ......... 701/102–105, 701/115; 123/295, 299, 300, 478, 480
See application file for complete search history.

(56) References Cited

U.S. PATENT DOCUMENTS 4,658,792 A * 4/1987 Yamashita et al. .......... 123/478
5,211,150 A * 5/1993 Anzai ......................... 123/480

FOREIGN PATENT DOCUMENTS

| JP | 5-1837 U | 1/1993 |
| JP | 09-256886 A | 9/1997 |
| JP | 2004-270583 A | 9/2004 |
| JP | 2005-155654 A | 6/2005 |
| JP | 2005-201184 A | 7/2005 |
| JP | 2006-329110 A | 12/2006 |

* cited by examiner

*Primary Examiner*—Hieu T Vo
(74) *Attorney, Agent, or Firm*—Arent Fox LLP.

(57) ABSTRACT

A fuel injection control apparatus and method for an internal combustion engine are provided for appropriately calculating fuel injection times for an in-cylinder fuel injection valve and a port fuel injection valve, thereby accurately controlling the amounts of fuel supplied to the internal combustion engine from the in-cylinder fuel injection valve and the port fuel injection valve, respectively. The fuel injection control apparatus calculates an in-cylinder fuel injection amount which should be injected by the in-cylinder fuel injection valve, and calculates an in-cylinder fuel injection time which is a valve opening time of the in-cylinder fuel injection valve in accordance with the calculated in-cylinder fuel injection amount and an acquired cylinder internal pressure. The fuel injection control apparatus further calculates a port fuel injection amount which should be injected by the port fuel injection valve, and calculates a port fuel injection time which is a valve opening time of the port fuel injection valve in accordance with the calculated port fuel injection amount and a detected pressure within an intake system.

8 Claims, 10 Drawing Sheets

F I G. 1
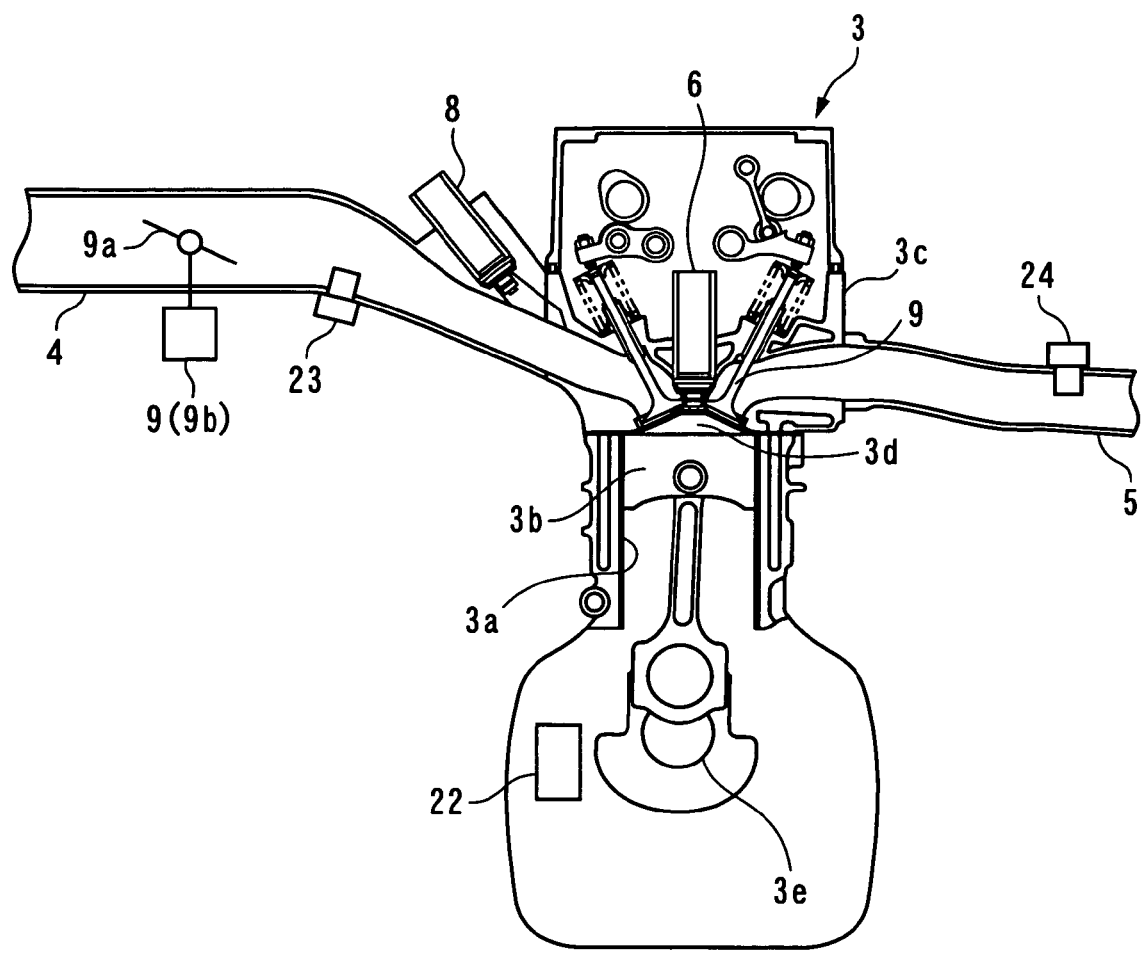

F I G. 6

| | LOWER ← NE → HIGHER |
|---|---|
| SMALLER ↑ PMCMD ↓ LARGER | GFDI11 · · · · · · · · GFDI1j<br>· · · · · · ·<br>· · · · · · ·<br>· · · · · · ·<br>GFDIi1 · · · · · · · · GFDIij |

| | LOWER ← NE → HIGHER | | |
|---|---|---|---|
| SMALLER ↑ TOUT_DI ↓ LARGER | $\theta INJendt\_DI11$ ⋮ $\theta INJendt\_DIi1$ | ⋯ ⋮ ⋯ | $\theta INJendt\_DI1j$ ⋮ $\theta INJendt\_DIij$ |

FUEL INJECTION CONTROL APPARATUS AND METHOD FOR INTERNAL COMBUSTION ENGINE

BACKGROUND OF THE INVENTION

1. Field of the Invention

The present invention relates to a fuel injection control apparatus and method for an internal combustion engine which is supplied with a fuel by an in-cylinder fuel injection valve for injecting the fuel into a cylinder, and a port fuel injection valve for injecting the fuel into an intake system including an intake port.

2. Description of the Prior Art

Conventionally, as this type of fuel injection control apparatus for an internal combustion engine, one described, for example, in Laid-open Japanese Patent Application No. 2003-13784 is known. In this fuel injection control apparatus, fuel injection control is conducted in the following manner. Specifically, a total amount of fuel is first calculated in accordance with an intake air amount from an in-cylinder fuel injection amount which should be injected by an in-cylinder fuel injection valve and a port fuel injection amount which should be injected by a port fuel injection valve. Next, the calculated total fuel amount is divided into an in-cylinder fuel injection amount and a port fuel injection amount to calculate the in-cylinder fuel injection amount and port fuel injection amount. Then, the amount of fuel accounting for the calculated in-cylinder fuel injection amount is injected by the in-cylinder fuel injection valve, while the amount of fuel accounting for the calculated port fuel injection amount is injected by the port fuel injection port.

Generally, a fuel is injected by opening a fuel injection valve through which a pressurized fuel is injected, so that the amount of injected fuel varies depending on the pressure of the fuel, the pressure of a site (volume) into which the fuel is injected, and the like, even if the fuel injection valve is opened for the same time period. On the other hand, the conventional fuel injection control apparatus, as described above, simply calculates an in-cylinder fuel injection amount and a port fuel injection amount. As such, in the conventional fuel injection control apparatus, the amounts of fuel actually injected from the in-cylinder fuel injection valve and port injection valve deviate from the in-cylinder fuel injection amount and the port fuel injection amount due to influences such as the pressure of the fuel, the pressure of a site at which the fuel is injected, and the like, resulting in a failure of accurately controlling the amount of fuel supplied to the internal combustion engine.

SUMMARY OF THE INVENTION

The present invention has been made to solve the problems as mentioned above, and it is an object of the invention to provide a fuel injection control apparatus and method for an internal combustion engine which are capable of appropriately calculating fuel injection times for an in-cylinder fuel injection valve and a port fuel injection valve, thereby accurately controlling the amounts of fuel supplied to the internal combustion engine from the in-cylinder fuel injection valve and the port fuel injection valve, respectively.

To achieve the above object, according to a first aspect of the present invention, there is provided a fuel injection control apparatus for an internal combustion engine which is supplied with a fuel by an in-cylinder fuel injection vale for injecting the fuel into a cylinder, and a port fuel injection valve for injecting the fuel into an intake system including an intake port. The fuel injection control apparatus is characterized by comprising in-cylinder fuel injection amount calculating means for calculating an in-cylinder fuel injection amount which should be injected by the in-cylinder fuel injection valve; cylinder internal pressure acquiring means for acquiring a cylinder internal pressure which is the pressure within the cylinder; in-cylinder fuel injection time calculating means for calculating an in-cylinder fuel injection time which is a valve opening time of the in-cylinder fuel injection valve in accordance with the calculated in-cylinder fuel injection amount and the acquired cylinder internal pressure; in-cylinder fuel injection valve control means for controlling the in-cylinder fuel injection valve in accordance with the calculated in-cylinder fuel injection time; port fuel injection amount calculating means for calculating a port fuel injection amount which should be injected by the port fuel injection port; intake system internal pressure detecting means for detecting the pressure within the intake system; port fuel injection time calculating means for calculating a port fuel injection time which is a valve opening time of the port fuel injection valve in accordance with the calculated port fuel injection amount and the detected pressure within the intake system; and port fuel injection valve control means for controlling the port fuel injection valve based on the calculated port fuel injection time.

According to this fuel injection control apparatus for an internal combustion engine, the in-cylinder fuel injection amount which should be injected by the in-cylinder fuel injection valve, and the port fuel injection amount which should be injected by the port fuel injection valve are calculated, the in-cylinder fuel injection time is calculated in accordance with the calculated in-cylinder fuel injection amount and the acquired cylinder internal pressure, and the in-cylinder fuel injection valve is controlled on the basis of the calculated in-cylinder fuel injection time. Further, the port fuel injection time is calculated in accordance with the calculated port fuel injection amount and the detected pressure within the intake system, and the port fuel injection valve is controlled on the basis of the calculated port fuel injection time.

The actual fuel amount injected from the in-cylinder fuel injection valve (hereinafter referred to as the "actual in-cylinder injected fuel amount") varies, even for the same valve opening time, in accordance with the cylinder internal pressure which is the pressure of a site at which the fuel is injected. According to the present invention, the in-cylinder fuel injection time, which is the valve opening time of the in-cylinder fuel injection valve, is calculated in accordance with not only the in-cylinder fuel injection amount but also the acquired cylinder internal pressure, as described above, so that the in-cylinder fuel injection time can be appropriately calculated while compensating for the influence of the cylinder internal pressure on the actual in-cylinder fuel injected fuel amount. Further, the actual fuel amount injected from the port fuel injection valve (hereinafter referred to as the "actual port injected fuel amount") varies, even for the same valve opening time, in accordance with the pressure within the intake system which is the pressure at a site at which the fuel is injected. According to the present invention, the port fuel injection time, which is the valve opening time of the port fuel injection valve, is calculated in accordance with not only the port fuel injection amount but also the detected pressure within the intake system, as described above, so that the port fuel injection time can be appropriately calculated while compensating for the influence of the pressure within the intake system on the actual port injected fuel amount. From the foregoing, it is possible to accurately control the amounts of fuel supplied to the internal combustion engine from the in-cylinder fuel injection valve and the port fuel injection valve (hereinafter referred to as the "in-cylinder supplied fuel amount" and "port supplied fuel amount").

To achieve the above object, according to a second aspect of the present invention, there is provided a fuel injection control method for an internal combustion engine which is supplied with a fuel by an in-cylinder fuel injection vale for injecting the fuel into a cylinder, and a port fuel injection valve for injecting the fuel into an intake system including an intake port. The fuel injection control method is characterized by comprising the steps of calculating an in-cylinder fuel injection amount which should be injected by the in-cylinder fuel injection valve; acquiring a cylinder internal pressure which is the pressure within the cylinder; calculating an in-cylinder fuel injection time which is a valve opening time of the in-cylinder fuel injection valve in accordance with the calculated in-cylinder fuel injection amount and the acquired cylinder internal pressure; controlling the in-cylinder fuel injection valve in accordance with the calculated in-cylinder fuel injection time; calculating a port fuel injection amount which should be injected by the port fuel injection port; detecting the pressure within the intake system; calculating a port fuel injection time which is a valve opening time of the port fuel injection valve in accordance with the calculated port fuel injection amount and the detected pressure within the intake system; and controlling the port fuel injection valve based on the calculated port fuel injection time.

This method provides the same advantageous effects as described above concerning the abnormality determining apparatus according to the first aspect of the invention.

Preferably, the fuel injection control apparatus for an internal combustion engine further comprises basic injection period setting means for setting a basic injection period of the fuel by the in-cylinder fuel injection valve in accordance with the in-cylinder fuel injection amount, wherein the in-cylinder fuel injection time calculating means uses the cylinder internal pressure which generates within the set basic fuel injection period as the cylinder internal pressure.

According to this preferred embodiment of the fuel injection control apparatus for an internal combustion engine, the basic fuel injection period of the fuel by the in-cylinder fuel injection valve is set, and the cylinder internal pressure within the set basic injection period is used for the calculation of the in-cylinder fuel injection time. The cylinder internal pressure varies in accordance with the position of a reciprocating piston of the internal combustion engine. According to the present invention, the in-cylinder fuel injection time can be appropriately calculated to be compatible with the actual cylinder internal pressure when the fuel is injected, by the configuration described above, thus making it possible to more accurately control the in-cylinder supplied fuel amount.

Preferably, the fuel injection control method for an internal combustion engine further comprises the step of setting a basic injection period of the fuel by the in-cylinder fuel injection valve in accordance with the in-cylinder fuel injection amount, wherein the step of calculating an in-cylinder fuel injection time includes using the cylinder internal pressure which generates within the set basic fuel injection period as the cylinder internal pressure.

This preferred embodiment of the fuel injection control method provides the same advantageous effects as described above concerning the fuel injection control apparatus according to the first aspect of the invention.

Preferably, the fuel injection control apparatus for an internal combustion engine further comprises fuel pressure detecting means for detecting the pressure of the fuel supplied to the in-cylinder fuel injection valve, wherein the in-cylinder fuel injection time calculating means calculates the in-cylinder fuel injection time in accordance further with the detected pressure of the fuel.

According to this preferred embodiment of the fuel injection control apparatus for an internal combustion engine, the pressure of the fuel supplied to the in-cylinder fuel injection valve (hereinafter referred to as the "fuel pressure") is detected, and the in-cylinder fuel injection time is calculated in accordance with the detected fuel pressure. Since the cylinder internal pressure varies in accordance with the position of the piston, and a pressure difference between the fuel pressure and the cylinder internal pressure varies in association therewith, the actual in-cylinder injected fuel amount varies even for the same valve opening time of the in-cylinder fuel injection valve. When the in-cylinder fuel injection valve injects the fuel within a compression stroke of the internal combustion engine, the fuel is injected into the cylinder at a high pressure, so that the fuel pressure is controlled to a higher value, resulting in an increase in the influence of the actual fuel pressure exerting on the actual in-cylinder injected fuel amount. According to the present invention, since an appropriate in-cylinder fuel injection time is calculated in accordance with the detected actual fuel pressure, the in-cylinder supplied fuel amount can be more accurately controlled.

Preferably, the fuel injection control method for an internal combustion engine further comprises the step of detecting the pressure of the fuel supplied to the in-cylinder fuel injection valve, wherein the step of calculating an in-cylinder fuel injection time includes calculating the in-cylinder fuel injection time in accordance further with the detected pressure of the fuel.

This preferred embodiment of the fuel injection control method provides the same advantageous effects as described above concerning the fuel injection control apparatus according to the first aspect of the invention.

Preferably, the fuel injection control apparatus for an internal combustion engine further comprises load parameter detecting means for detecting a load parameter indicative of a load on the internal combustion engine; total required fuel calculating means for calculating a total required fuel amount in accordance with the detected load parameter; and rotational speed detecting means for detecting the rotational speed of the internal combustion engine, wherein the in-cylinder fuel injection amount calculating means calculates the in-cylinder fuel injection amount at least in accordance with the detected rotational speed of the internal combustion engine, and the port fuel injection amount calculating means calculates the port fuel injection amount by subtracting the in-cylinder fuel injection amount from the calculated total required fuel amount.

According to this preferred embodiment of the fuel injection control apparatus for an internal combustion engine, the total required fuel amount is calculated in accordance with the detected load parameter, and the in-cylinder fuel injection amount is calculated in accordance with at least the detected rotational speed of the internal combustion engine, and the port fuel injection amount is calculated by subtracting the in-cylinder fuel injection amount from the calculated total required fuel amount.

Generally, in an internal combustion engine of the type which supplies a fuel using an in-cylinder fuel injection valve and a port fuel injection valve, a stratified air-fuel mixture and a homogeneous air-fuel mixture are generated respectively by the fuel injection of the in-cylinder fuel injection valve and the port fuel injection valve, the stratified air-fuel mixture is burnt with spark ignition, and the homogeneous air-fuel mixture is burned with self ignition using the burning stratified air-fuel mixture as a torch (hereinafter, such combustion is referred to as the "torch self ignition combustion"). According to the present invention, since the in-cylinder fuel injection amount for producing the stratified air-fuel mixture which serves as a torch is calculated in preference to the port fuel injection amount, the torch self ignition combustion can be appropriately carried out. Also, the amount of fuel required to produce a torch for causing the homogeneous air-fuel mixture to burn with self ignition varies in accordance with the flow of the air-fuel mixture within the cylinder, and the like, and the flow of the air-fuel mixture within the cylinder has a close correlation with the rotational speed of the internal combustion engine. According to the present invention, since the in-cylinder fuel injection amount calculated in accordance with the rotational speed of the internal combustion engine is used as described above, thus making it possible to appropriately produce a torch and therefore more appropriately carry out the torch self ignition combustion.

Preferably, the fuel injection control method for an internal combustion engine further comprises the step of detecting a load parameter indicative of a load on the internal combustion engine; calculating a total required fuel amount in accordance with the detected load parameter; and detecting the rotational speed of the internal combustion engine, wherein the step of calculating an in-cylinder fuel injection amount includes calculating the in-cylinder fuel injection amount at least in accordance with the detected rotational speed of the internal combustion engine, and the step of calculating a port fuel injection amount includes calculating the port fuel injection amount by subtracting the in-cylinder fuel injection amount from the calculated total required fuel amount.

This preferred embodiment of the fuel injection control method provides the same advantageous effects as described above concerning the fuel injection control apparatus according to the first aspect of the invention.

BRIEF DESCRIPTION OF THE DRAWINGS

FIG. 1 is a diagram generally showing an internal combustion engine to which a fuel injection control apparatus according to the present invention is applied;

FIG. 6 is an example of a map used in the process of FIG. 5;

DETAILED DESCRIPTION OF THE EMBODIMENT

In the following, a preferred embodiment of the present invention will be described with reference to the drawings. FIG. 1 generally shows an internal combustion engine 3 to which a fuel injection control apparatus 1 according to this embodiment is applied. The internal combustion engine (hereinafter referred to as the "engine") 3 is, for example, an in-line four-cylinder type four cycle gasoline engine which is equipped in a vehicle (not shown).

Figure 2:
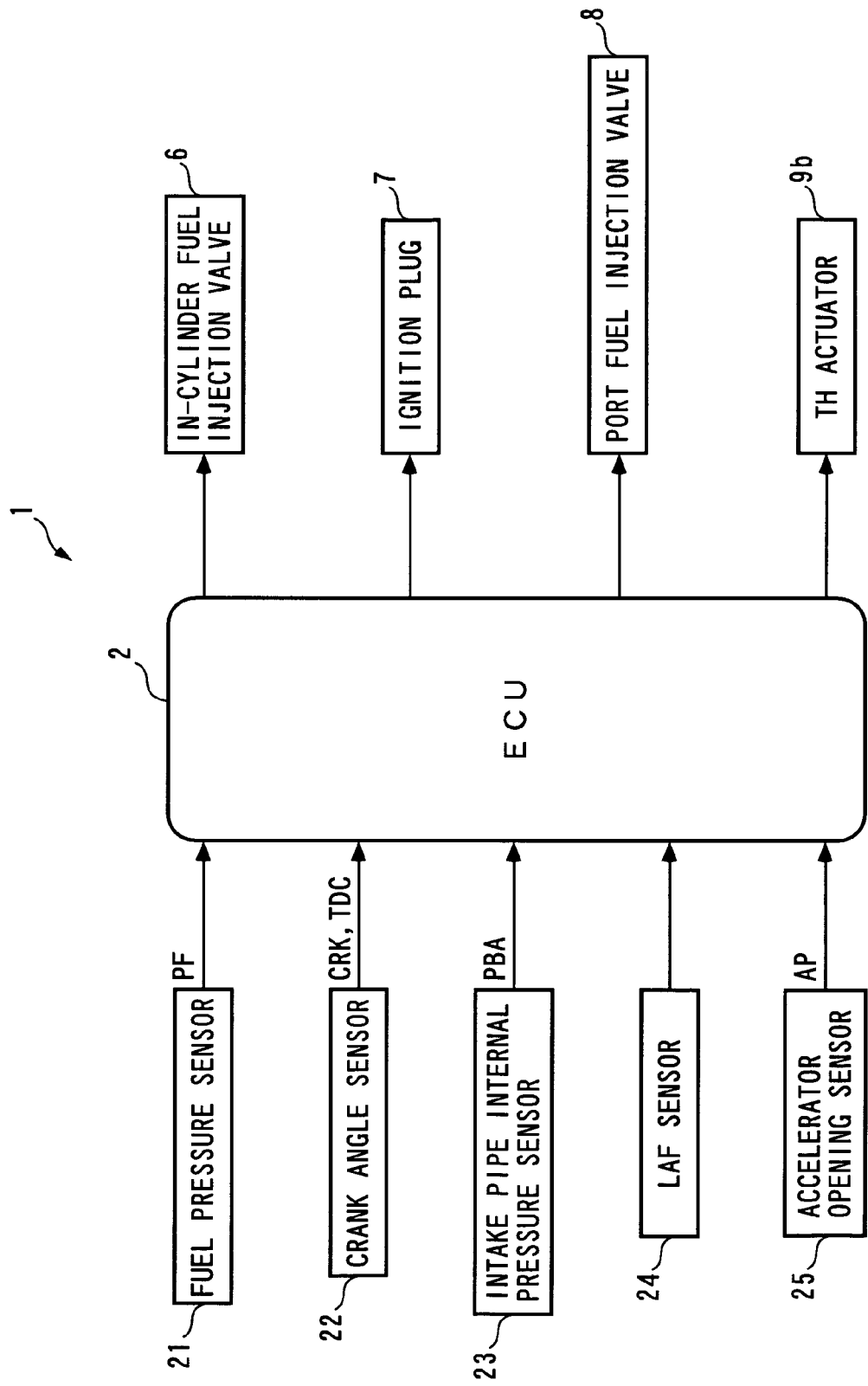
FIG. 2 is a block diagram of the fuel injection control apparatus.

A cylinder head 3c of the engine 3 is connected to an intake pipe 4 (intake system) and an exhaust pipe 5 for each cylinder 3a, and an in-cylinder fuel injection valve 6 and an ignition plug 7 (see FIG. 2) are attached to face a combustion chamber 3d (only one each of which is shown in FIG. 1). This in-cylinder fuel injection valve 6 is configured to inject a fuel in the vicinity of an ignition plug 7 within the cylinder 3a. Also, a valve opening time and valve opening/closing timings of the in-cylinder fuel injection valve 6, as well as an ignition timing of the ignition plug 7 are controlled by an ECU, later described, of the control apparatus 1.

The in-cylinder fuel injection valve 6 is also connected to a first fuel pump through a fuel pipe (non of which is shown), such that a fuel is boosted to a high pressure by this first fuel pump and supplied into the in-cylinder fuel injection valve 6 from a fuel tank (not shown). The operation of the first fuel pump is controlled by the ECU 2, thereby controlling the pressure PF of the fuel supplied to the in-cylinder fuel injection valve 6 (hereinafter referred to as the "in-cylinder fuel pressure). The in-cylinder fuel pressure PF is basically controlled to a predetermined reference in-cylinder fuel pressure PFREF (for example, 10 MPa). Also, near the in-cylinder fuel injection valve 6 in the fuel pipe, a fuel pressure sensor 21 (see FIG. 2) (fuel pressure detecting means) is attached, and this fuel pressure sensor 21 outputs a detection signal indicative of the in-cylinder fuel pressure PF to the ECU 2.

The engine 3 is provided with a crank angle sensor 22 (rotational speed detecting means). The crank angle sensor 22 is made up of a magnet rotor and an MRE pickup (none of which is shown), and outputs a CRK signal and a TDC signal, both of which are pulse signals, to the ECU 2 in association with the rotation of a crank shaft 3e.

This CRK signal is output every predetermined crank angle (for example, every 30°). The ECU 2, based on the CRK signal, calculates the rotational speed NE of the engine 3 (hereinafter referred to as the "engine rotational speed"). The aforementioned TDC signal is a signal which indicates that the piston 3b of the cylinder 3a is present at a predetermined crank angle position near the TDC (top dead center) at the start of an intake stroke, and one pulse is output every 180° of the crank angle in this example which is a four-cylinder type. The engine 3 is also provided with a cylinder discrimination sensor (not shown). This cylinder discrimination sensor outputs a cylinder discrimination signal, which is a pulse signal for discriminating the cylinder 3a, to the ECU 2. The ECU 2 calculates a crank angle position CA for each cylinder 3a in accordance with these cylinder discrimination signal, CRK signal and TDC signal.

A port fuel injection valve 8 is provided in an intake manifold of the intake pipe 4 for each cylinder 3a to face a intake port. This port fuel injection valve 8 is connected to a second fuel pump. The fuel is boosted to a high pressure by this second fuel pump, and is then supplied to the port fuel injection valve 8. The operation of the second fuel pump is controlled by the ECU 2, thereby controlling the pressure of the fuel supplied to the port fuel injection valve 8 (hereinafter referred to as the "port fuel pressure"). The port fuel pressure is basically controlled to a predetermined reference port fuel pressure (for example, 350 kPa) lower than the aforementioned reference in-cylinder fuel pressure PFREF. Also, a valve opening time and valve opening/closing timings of the port fuel injection valve 8 are controlled by the ECU 2.

The intake pipe 4 is also provided with a throttle valve mechanism 9. The throttle valve mechanism 9 has a throttle valve 9a and a TH actuator 9b for driving the same to open and close. The throttle valve 9a is pivotably provided within the intake pipe 4, to change an intake air amount QA with a change in opening associated with the pivotal movement. The TH actuator 9b is a combination of a motor with a gear mechanism (none of which is shown), and is driven by a driving signal from the ECU 2 to control the opening of the throttle valve 9a.

An internal intake pipe pressure sensor 23 (intake pipe internal pressure detecting means) is provided at a location downstream of the throttle valve 9a of the intake pipe 4. This internal intake pipe pressure sensor 23 detects the pressure PBA within the intake pipe 4 (hereinafter referred to as the "internal intake pressure") and outputs its detection signal to the ECU 2.

The exhaust pipe 5 is provided with an LAF sensor 24. The LAF sensor 24 linearly detects the oxygen concentration within exhaust gases which flows through the exhaust pipe 5 in a wide region of air-fuel-ratio from a richer region than the stoichiometric air-fuel ratio to an extremely lean region, and outputs its detection signal to the ECU2. The ECU2 calculates a detected air-fuel ratio KACT indicative of the actual air-fuel ratio of an air-fuel mixture mixed in the combustion chamber 4d based on the oxygen concentration detected by the LAF sensor 24. In this event, the detected air-fuel ratio KACT is calculated as an equivalence ratio.

The ECU 2 is further supplied with a detection signal indicative of an accelerator pedal manipulation amount (hereinafter referred to as the "accelerator opening") AP from an accelerator opening sensor 25.

The ECU 2 is based on a microcomputer which is comprised of an I/O interface, a CPU, a RAM, a ROM and the like. Also, the ECU 2 determines the operating condition of the engine 3 in accordance with the detection signals from a variety of sensors 21-25 mentioned above, determines a combustion mode of the engine 3, and executes a fuel injection control process in accordance with the determined combustion mode. In this regard, the ECU 2 is comparable to an in-cylinder fuel injection amount calculating means, a cylinder internal pressure acquiring means, an in-cylinder fuel injection time calculating means, an in-cylinder fuel injection valve control means, a port fuel injection amount calculating mans, a port fuel injection time calculating means, a port fuel injection valve control means, a basic fuel period setting means, a load parameter detecting means, a total required fuel amount calculating means, and a rotational speed detecting means in this embodiment.

The combustion mode is one of a stratified self ignition combustion mode, a stratified flame propagation combustion mode, a torch self combustion mode, and a homogeneous flame propagation combustion mode.

Stratified self ignition combustion mode: a combustion mode which involves producing a stratified air-fuel mixture by injecting a fuel during a compression stroke by the in-cylinder fuel injection valve 6 and burning the same with self injection.

Stratified flame propagation combustion mode: a combustion mode which involves producing a stratified air-fuel mixture by injecting a fuel during a compression stroke by the in-cylinder fuel injection valve 6 and burning the same with flame propagation through a spark ignition by the ignition plug 7.

Torch self ignition combustion mode: after producing a homogenous air-fuel mixture by injecting a fuel during an intake stroke by the port fuel injection valve 8, a trace of fuel is injected during a compression stroke by the in-cylinder fuel injection valve 6, thereby generating an air-fuel mixture which includes both of the homogeneous air-fuel mixture and the stratified air-fuel mixture. Then, the produced stratified air-fuel mixture is burnt with flame propagation through a spark ignition, and the homogeneous air-fuel mixture is burnt with self ignition using this as a torch.

Homogeneous flame propagation combustion mode: a combustion mode which involves producing a stratified air-fuel mixture by injecting a fuel during a compression stroke by the in-cylinder fuel injection valve 6 and burning with flame propagation through spark ignition.

The determination of the combustion mode is made in accordance with the engine rotational speed NE and a required torque PMCMD (load parameter) required by the engine 3, and the value of a combustion mode monitor STS_BURNCMD indicative of the combustion mode is set in accordance with that.

More specifically describing, when the engine rotational speed NE is in a predetermined low rotation region with the required torque PMCMD being in a predetermined low load region, in other words, when the operating condition of the engine 3 is in a predetermined first operating region, the stratified self ignition combustion mode is selected, so that the combustion mode monitor STS_BURNCMD is se to "1." On the other hand, when the engine rotational speed NE is in a low-middle rotation region with the required torque being in a lower load region than the first operating region, in other words, when the operating condition of the engine 3 is in a predetermined second operating region (region in which the stratified air-fuel mixture does not burn with self ignition), the stratified flame propagation combustion mode is selected, so that the combustion mode monitor STS_BURNCMD is set to "2."

Further, when the engine rotational speed NE is in the low-middle rotation region with the required torque PMCMD being in a higher load region than the predetermined first operating region, in other words, when the operating condition of the engine 3 is in a predetermined third operating region, the torch self ignition combustion mode is selected, so that the combustion mode monitor STS_BURNCMD is set to "3." Also, when the operating condition of the engine 3 represented by the engine rotational speed NE and the required torque PMCMD is in a predetermined fourth operating region other than the aforementioned first to third operating region, the homogeneous flame propagation combustion mode is selected, and the combustion mode monitor STS_BURNCMD is set to "4."

Figure 3:
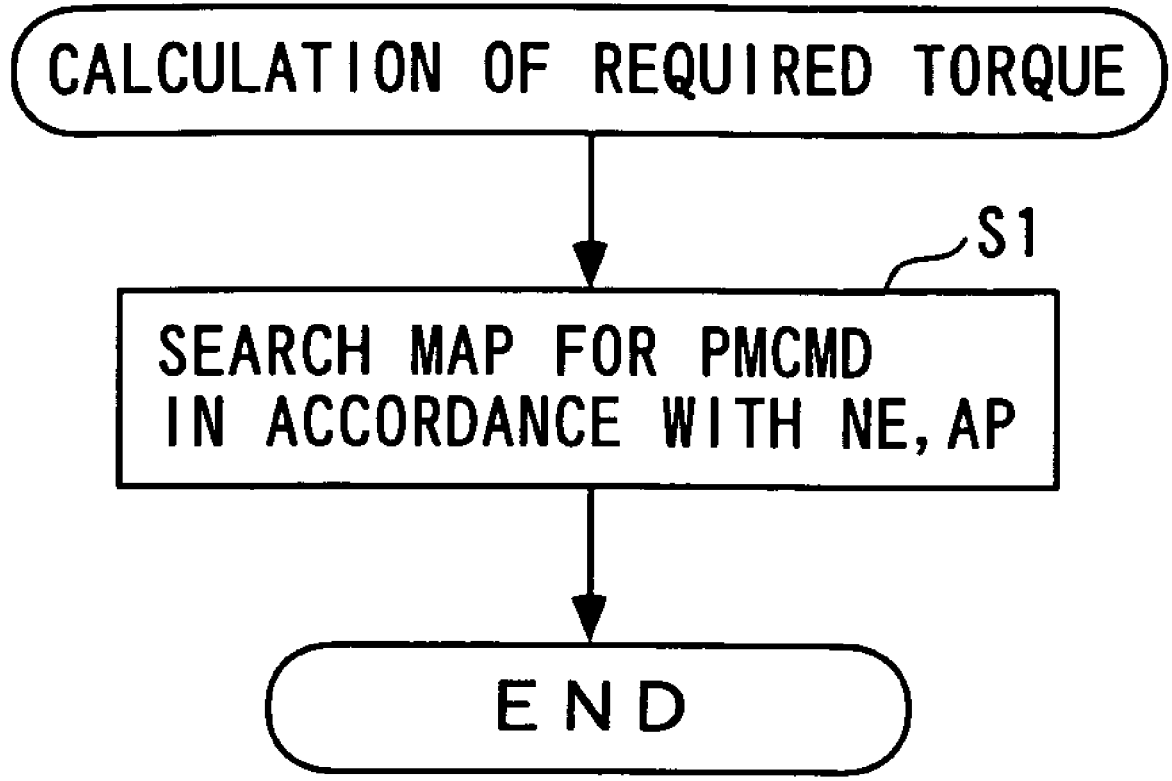
FIG. 3 is a flow chart showing a required torque calculation process.

Further, the required torque PMCMD is calculated by searching a map (not shown) in accordance with the engine rotational speed NE and the accelerator opening AP at step 1 (labeled "S1" in the figure. the same is applied to the following description) in FIG. 3.

Figure 4:
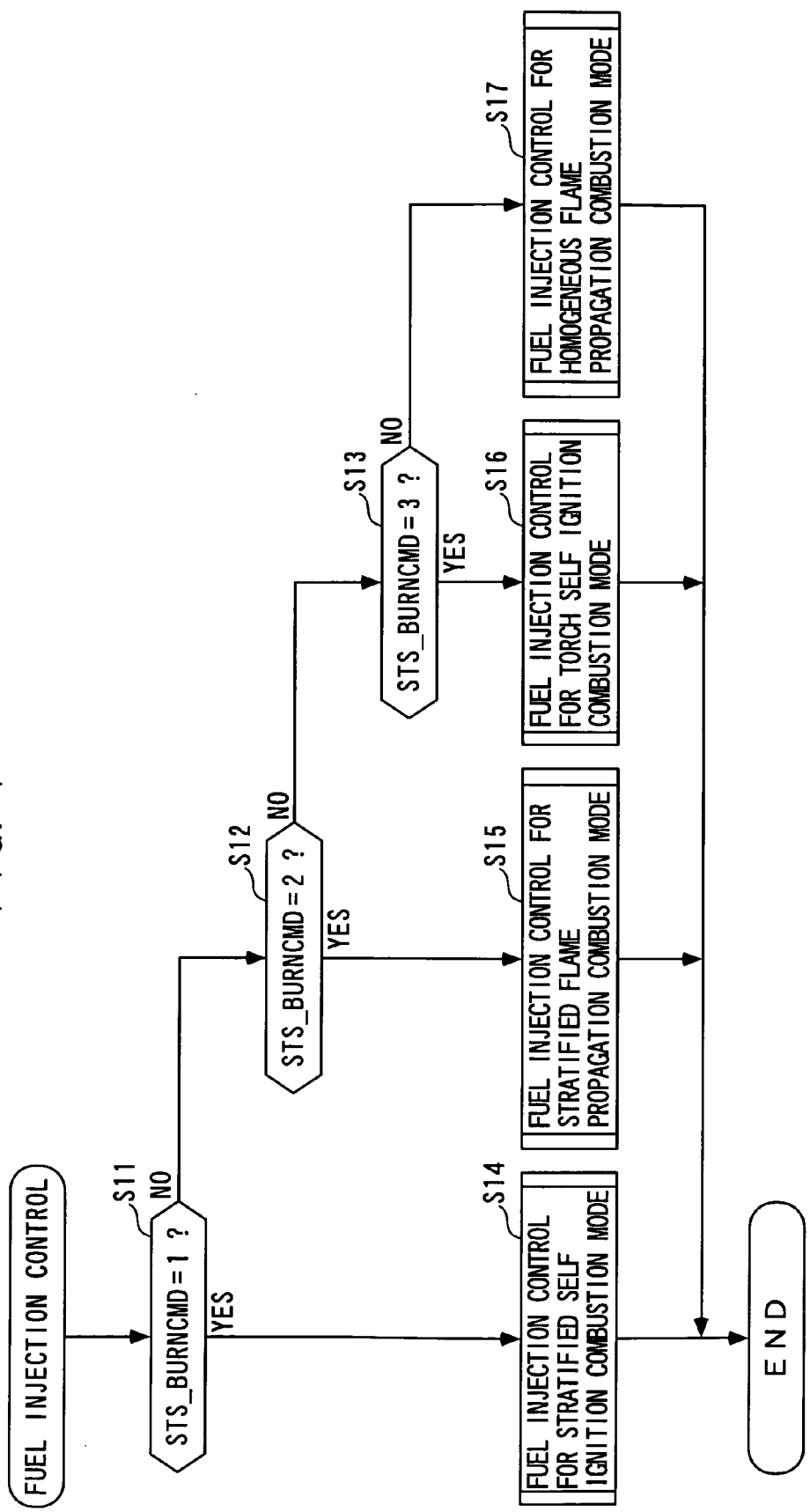
FIG. 4 is a flow chart showing a fuel injection control process.

Next, a fuel injection control process will be described with reference to FIG. 4. This process is executed in synchronism with the input of a TDC signal. First, at steps 11-13, it is determined whether or not the combustion mode monitor STS_BURNCMD is "1"-"3," respectively. In other words, the current combustion mode is discriminated.

Then, in accordance with the result of the discrimination, fuel injection control for each mode is executed at steps 14-17, followed by the termination of this process.

The fuel injection control for the stratified self ignition combustion mode and the stratified flame propagation combustion mode (steps 14, 15) is conducted in similar manner, so that the former alone will be described below, as representative of them. As described above, in this stratified self ignition combustion mode, the fuel is supplied to the engine 3 only by the in-cylinder fuel injection valve 6. As such, in this process, an in-cylinder fuel injection amount GFDI which should be injected by the in-cylinder fuel injection valve 6 is first calculated, and an in-cylinder fuel injection time TOUT_DIf which is a valve opening time of the in-cylinder fuel injection valve 6 is calculated on the basis of the calculated in-cylinder fuel injection amount GFDI.

Next, a start timing and an end timing of the fuel injection by the in-cylinder fuel injection valve 6 are calculated in accordance with the calculated in-cylinder fuel injection time TOUT_DIf and the engine rotational speed NE. In the following, these injection start and injection end timings are referred to as the "in-cylinder injection start timing θINJst_DI" and "in-cylinder injection end timing θINJend_DI," respectively. These in-cylinder injection start/end timings θINJst_DI, θINJend_DI are calculating as timings during a compression stroke, and are represented by the crank angle position CA.

Also, control signals based on the in-cylinder injection start/end timings θINJst_DI, θINJend_DI are output to the in-cylinder fuel injection valve 6. In this way, the valve opening/closing timings of the in-cylinder fuel injection valve 6 are controlled to the calculated in-cylinder injection start/end timings θINJst_DI, θINJend_DI, and the amount of fuel actually injected from the in-cylinder fuel injection valve 6 (hereinafter referred to as the "actual in-cylinder injected fuel amount") is controlled to an in-cylinder fuel injection amount GFDI. In this regard, a specific description on a method of calculating a variety of the aforementioned parameters is omitted.

Also, the fuel injection control process (step 17) for the homogeneous flame propagation combustion mode is performed in the following manner. Specifically, as described above, in the homogeneous flame propagation combustion mode, the fuel is supplied to the engine 3 mainly by the port fuel injection valve 8 alone. As such, in this process, a port fuel injection amount GFPO which should be injected by the port fuel injection valve 8 is calculated, and a port fuel injection time TOUT_PO which is a valve opening time of the port fuel injection valve 8 is calculated on the basis of the calculated port fuel injection amount GFPO.

Next, a start timing and an end timing of the fuel injection by the port fuel injection valve 8 are calculated in accordance with the calculated port fuel injection time TOUT_PO and the engine rotational speed NE. In the following, these injection start and injection end timings are referred to as the "port injection start timing θINJst_PO" and "port injection end timing θINJend_PO," respectively. These port injection start/end timings θINJst_PO, θINJend_PO are calculated as timings during an intake stroke.

Also, the calculated port injection start/end timings θINJst_PO, θINJend_PO are output to the port fuel injection valve 8. In this way, the valve opening/closing timings of the port fuel injection valve 8 are controlled to the calculated port injection start/end θINJst_PO, θINJend_PO, and the amount of fuel actually injected from the port fuel injection valve 8 (hereinafter referred to as the "real port injected fuel amount") is controlled to a port fuel injection amount GFPO. IN this regard, a specific description on a method of calculating a variety of the aforementioned parameters is omitted.

Figure 5:
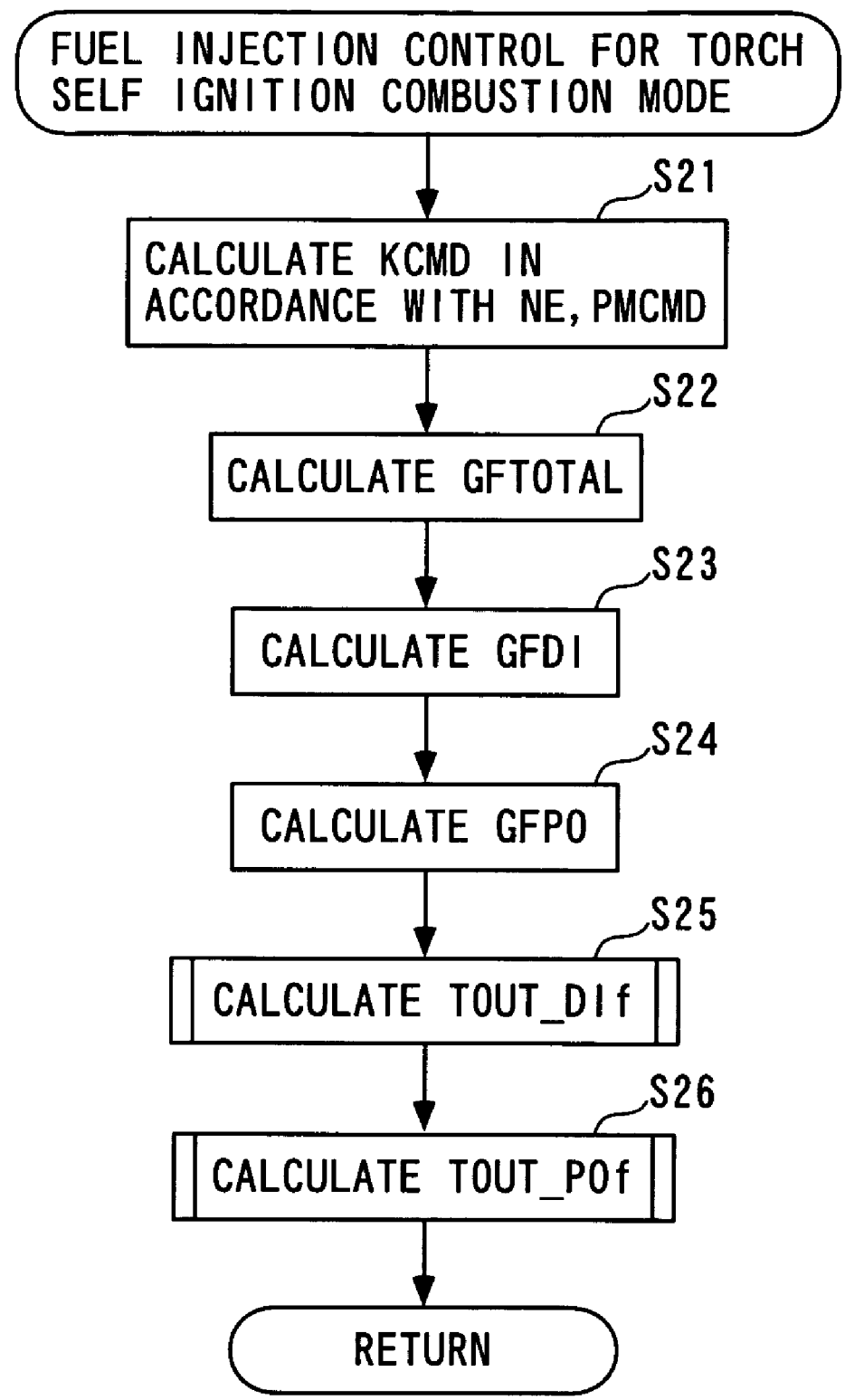
FIG. 5 is a flow chart showing a sub-routine of the fuel injection control process for a torch self ignition combustion mode at step 16 in FIG. 4.

Next, the fuel injection control process for the torch self ignition combustion mode at step 16 will be described with reference to FIG. 5. As described above, unlike the other combustion modes, in the torch self ignition combustion mode, the fuel is supplied to the engine 3 by both of the in-cylinder fuel injection valve 6 and the port fuel injection valve 8. As such, in this process, a variety of parameters are calculated for controlling the in-cylinder fuel injection valve 6 and the port fuel injection valve 8.

Specifically, at step 21, a target air-fuel ratio CMD is first calculated by searching a map (not shown) in accordance with the engine rotational speed NE and the required torque PMCM. Next, a total required fuel amount GFTOTAL is calculated using the calculated target air-fuel ratio KCMD, a detected air-fuel ratio KACT and the like (step 22). This total required fuel amount GFTOTAL represents the sum total of the in-cylinder fuel injection amount GFDI and the port fuel injection amount GFPO. Specifically, first, a basic total required fuel amount is calculated by a predetermined feedback control algorithm in accordance with a deviation of the detected air-fuel ratio KACT from the target air-fuel ratio KCMD. Then, the calculated basic total required fuel amount is corrected by a predetermined correction term to calculate the total required fuel amount GFTOTAL.

Next, an in-cylinder fuel injection amount GFDI is calculated by searching a GFDI map shown in FIG. 6 in accordance with the engine rotational speed NE and the required torque PMCMD (step 23). In this GFDI map, the in-cylinder fuel injection amount GFDI is set to a smaller value as the engine rotational speed NE is higher, and to a larger value as the required torque PMCMD is larger. This is because in the torch self ignition combustion mode, the fuel injected by the in-cylinder fuel injection valve 6 is used for the production of a torch for burning the homogeneous air-fuel ratio with self ignition. Also, this is because a more fuel is required to generate a larger torque of the engine as the required torque PMCMD is larger.

Next, the in-cylinder fuel injection amount GFDI calculated at step 23 is subtracted from the total required fuel amount GFTOTAL calculated at step 22 to calculate the port fuel injection amount GFPO (step 24).

Figure 7:
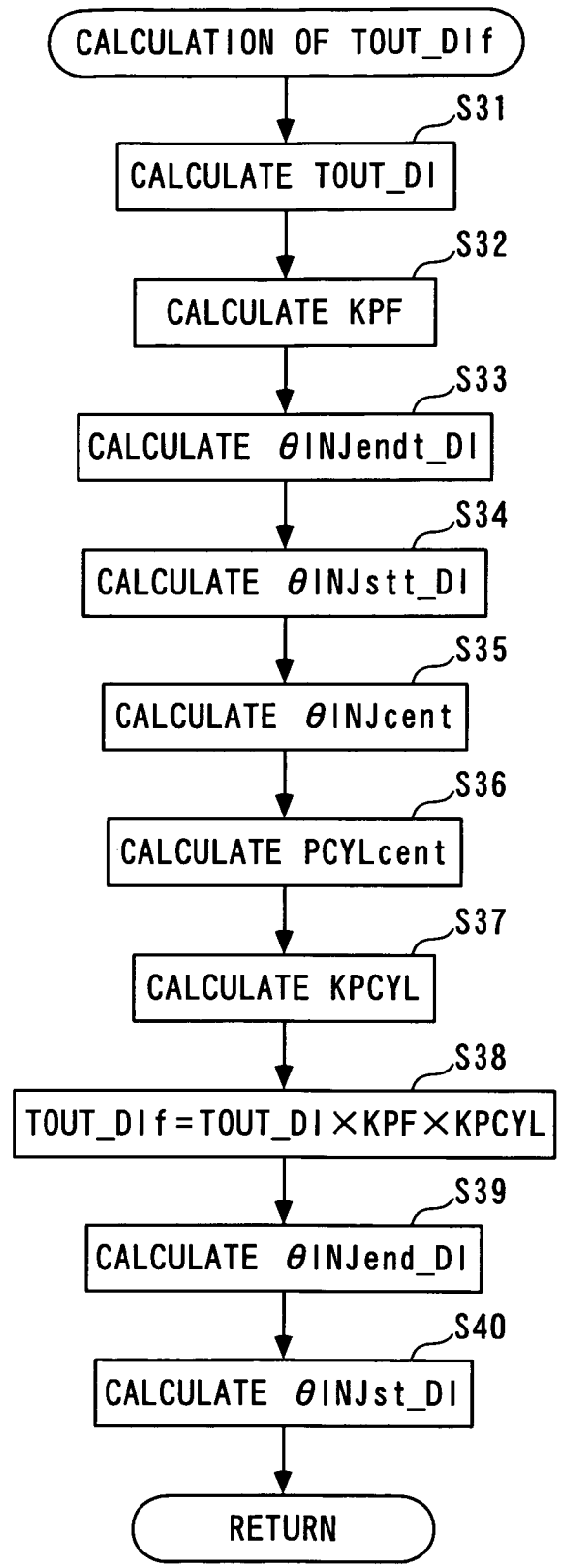
FIG. 7 is a flow chart showing a sub-routine of a TOUT-DIf calculation process at step 25 in FIG. 5.

Next, the in-cylinder fuel injection time TOUT_DIf is calculated (step 25). FIG. 7 shows a process for calculating this in-cylinder fuel injection time TOUT_DIf. First, at step 31, a basic in-cylinder fuel injection time TOUT_DI is calculated by searching a TOUT_DI table (not shown) based on the in-cylinder fuel injection amount calculated at the aforementioned step 23. This TOUT_DI table represents the relationship between a valve opening time of the in-cylinder fuel injection valve 6 and an actual in-cylinder fuel injection amount which are derived when the in-cylinder fuel pressure PF is at the aforementioned reference in-cylinder fuel pressure PFREF, and the pressure within the cylinder 3a (hereinafter referred to as the "cylinder internal pressure") is at a predetermined reference cylinder internal pressure, which has been established through an experiment and represented in a tabular form. Also, in the TOUT_DI table, the reference in-cylinder fuel injection time TOUT_DI is linearly set to a larger value as the in-cylinder fuel injection amount GFDI is larger.

Figures 8, 9:
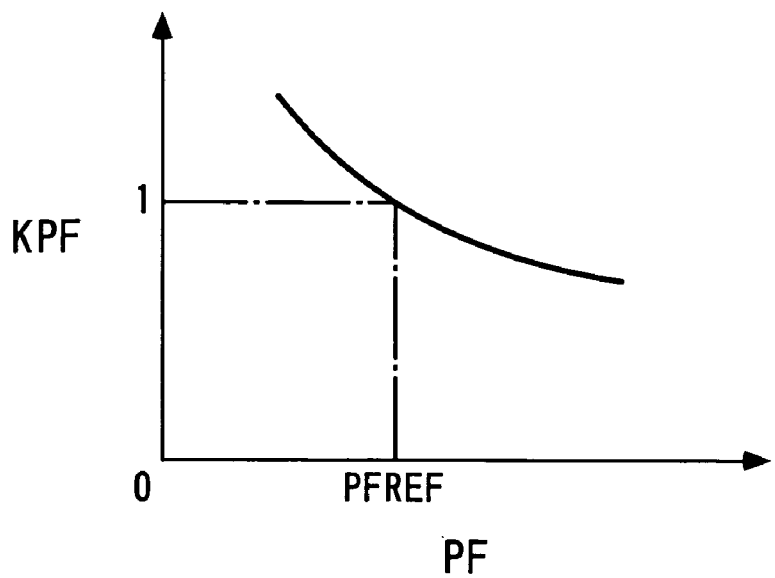
FIG. 8 is an example of a KPF table used in the process of FIG. 7.
FIG. 9 is an example of a θINJendt_DI map used in the process of FIG. 7.

Next, a fuel pressure correction coefficient KPF is calculated by searching a KPF table shown in FIG. 8 in accordance with the in-cylinder fuel pressure PF (step 32). This fuel pressure correction coefficient KPF is provided for correcting the basic in-cylinder fuel injection time TOUT_DI and calculating the in-cylinder fuel injection time TOUT_DIf. In the KPF table, the fuel pressure correction coefficient KPF is set at the value of one when the in-cylinder fuel pressure PF is at the reference in-cylinder fuel pressure PFREF, and is set to a larger value as the in-cylinder fuel pressure PF is lower. This is intended to incrementally correct the basic in-cylinder fuel injection time TOUT_DI because the actual in-cylinder fuel injection amount becomes smaller as the in-cylinder fuel pressure PF is lower for the same valve opening time of the in-cylinder fuel injection valve 6.

Next, a basic in-cylinder injection end timing θINJendt_DI is calculated by searching a θINJendt_DI map shown in FIG. 9 in accordance with the basis in-cylinder fuel injection time TOUT_ID calculated at the aforementioned step 31 and the engine rotational speed NE (step 33). The basic in-cylinder injection end timing θINJendt_DI is a preliminary value of the aforementioned in-cylinder injection end timing θINJend_DI, and is represented by the crank angle position CA. In this θINJendt_DI map, the basic in-cylinder injection end timing θINJendt_DI is set at a timing in a compression stroke.

Next, a basic in-cylinder injection start timing θINJstt_DI is calculated in accordance with the basic in-cylinder injection end timing θINJendt_ID calculated at the aforementioned step 33, the basic in-cylinder fuel injection time TOUT_DI, and the engine rotational speed NE (step 34). Specifically, the basic in-cylinder fuel injection time TOUT_DI is converted to a crank angle in accordance with the engine rotational speed, and subsequently is subtracted from the basic in-cylinder injection end timing θINJendt_DI to calculate the basic in-cylinder injection start timing θINJstt_DI. This basic in-cylinder injection start timing θINJstt_DI is a preliminary value of the aforementioned in-cylinder injection start timing θINJst_DI, as represented by the crank angle position CA, and is calculated as a timing during a compression stroke, earlier than the basic in-cylinder injection end timing θINJendt_DI. In this regard, in this embodiment, a period defined by the basic in-cylinder injection start timing θINJstt_DI and the basic in-cylinder injection end timing θINJendt_DI accounts for the basic injection period.

Next, an average value [(θINJstt_DI+θINJendt_DI)/2] of the sum of the basic in-cylinder injection start timing θINJstt_DI calculated at step 34 and the basic in-cylinder injection end timing θINJendt_DI is calculated as an intermediate timing θINJcent (step 35). As is apparent from this calculation approach, this intermediate timing θINJcent is comparable to an intermediate timing within a basic injection period defined by the basic in-cylinder injection start/end timings θINJstt_DI, θINJendt_DI.

Figure 10:
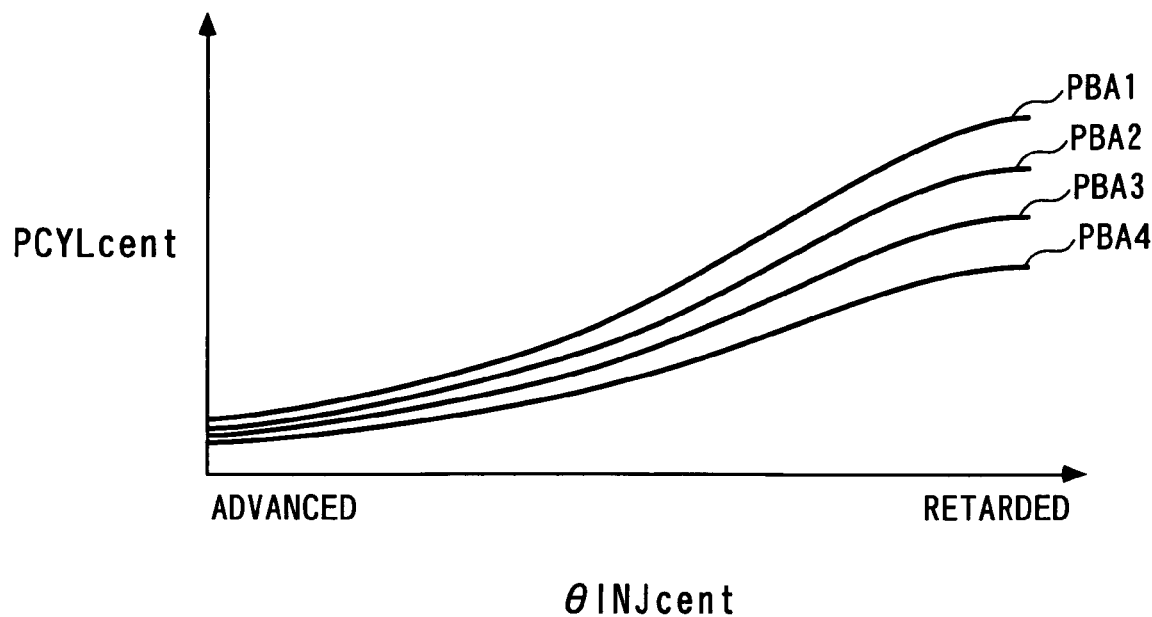
FIG. 10 is an example of a PCYLcent map used in the process of FIG. 7.

Next, an estimated cylinder internal pressure PCYLcent (acquired cylinder internal pressure) is calculated by searching a PCYLcent map shown in FIG. 10 in accordance with the calculated intermediate timing θINJcent and the intake pipe internal pressure PBA (step 36). This estimated cylinder internal pressure PCYLcent is an estimate of the pressure within the cylinder 3 (hereinafter referred to as the "cylinder internal pressure"). In FIG. 10, PBA1-PBA4 are predetermined values of the intake pipe internal pressure (PBA1>PBA2>PB3>PBA4).

This PCYLcent map represents the relationship between the actual cylinder internal pressure from the start to the end of a compression stroke of the engine 3, the crank angle position CA, and the intake pipe internal pressure PBA, which has been established through an experiment and represented in a tabular form. Also, in this map, the estimated cylinder internal pressure PCYcent is set to a larger value as the intermediate timing θINJcent is more retarded, i.e., the compression stroke is closer to the end, or as the intake pipe internal pressure PBA is higher, i.e., the intake air amount QA is larger.

Figure 11:
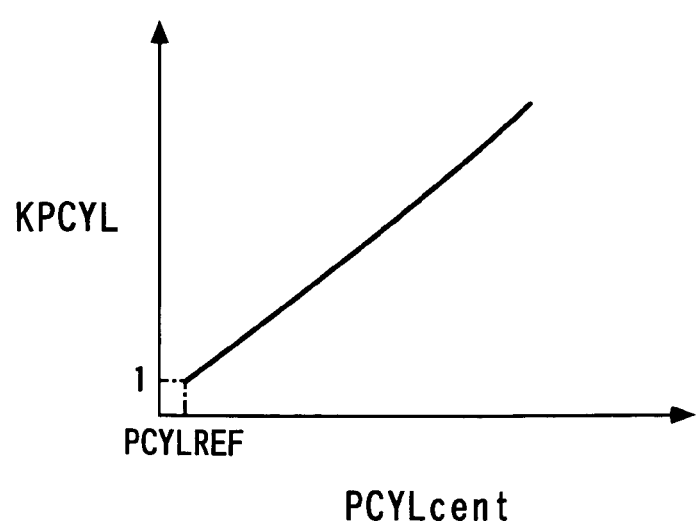
FIG. 11 is an example of a KPCYL table used in the process of FIG. 7.

Next, an cylinder internal pressure correction coefficient KPCYL is calculated by searching a KPCYL table shown in FIG. 11 in accordance with the calculated estimated cylinder internal pressure PCYLcent (step 37). This cylinder internal pressure correction coefficient KPCYL is provided, as is the case with the aforementioned fuel pressure correction coefficient KPF, for correcting the basic in-cylinder fuel injection time TOUT_DI and calculating the in-cylinder fuel injection time TOUT_DIf. In this KPCYL table, the cylinder internal pressure correction coefficient KPCYL is set at the value of one when the estimated cylinder internal pressure PCYLcent is at the aforementioned reference cylinder internal pressure PCYLREF, and is set to a larger value as the estimated cylinder internal pressure PCYLcent is higher. This is intended to incrementally correct the basic in-cylinder fuel injection time TOUT_DI because the actual in-cylinder fuel injected fuel amount is smaller as the cylinder internal pressure is higher for the same valve opening time of the in-cylinder fuel injection valve 6.

Next, the basic in-cylinder fuel injection time TOUT_DI is multiplied by the fuel pressure correction coefficient KPF and the cylinder internal pressure correction coefficient KPCYL to calculate the in-cylinder fuel injection time TOUT_DIf (step 38). Next, the in-cylinder injection end timing θINJend_DI is calculated using the calculated in-cylinder fuel injection time TOUT_DIf (step 39), and the in-cylinder injection start timing θINJst_DI is calculated (step 40), followed by the termination of this process.

The calculation of these in-cylinder injection end timing θINJend_DI and in-cylinder injection start timing θINJst_DI is performed in a manner similar to the calculation of the aforementioned basic in-cylinder injection end timing θINJendt_DI and basic in-cylinder injection start timing θINJstt_DI, respectively. Specifically, a map (not shown) is searched in accordance with the in-cylinder fuel injection time TOUT_DIf and the engine rotational speed NE to calculate the in-cylinder injection end timing θINJend_DI. Also, the in-cylinder fuel injection time TOUT_DIf is converted to a crank angle in accordance with the engine rotational speed NE, and subsequently is subtracted from the in-cylinder injection end timing θINJend_DI to calculate the in-cylinder injection start timing θINJst_DI. In this way, the in-cylinder injection start/end timings θINJst_DI, θINJend_DI are calculated as timings in the compression stroke.

Also, driving signals based on the in-cylinder injection start/end timings θINJst_DI, θINJend_DI are output to the in-cylinder fuel injection valve 6. In this way, the valve opening/closing timings of the in-cylinder fuel injection valve 6 are controlled to the calculated in-cylinder injection start/end timings θINJst_DI, θINJendDI, the valve opening time of the in-cylinder fuel injection valve 6 is controlled to the in-cylinder fuel injection time OUT_DIf, and the actual in-cylinder injected fuel amount is controlled to the in-cylinder fuel injection amount GFDI.

Figure 12:
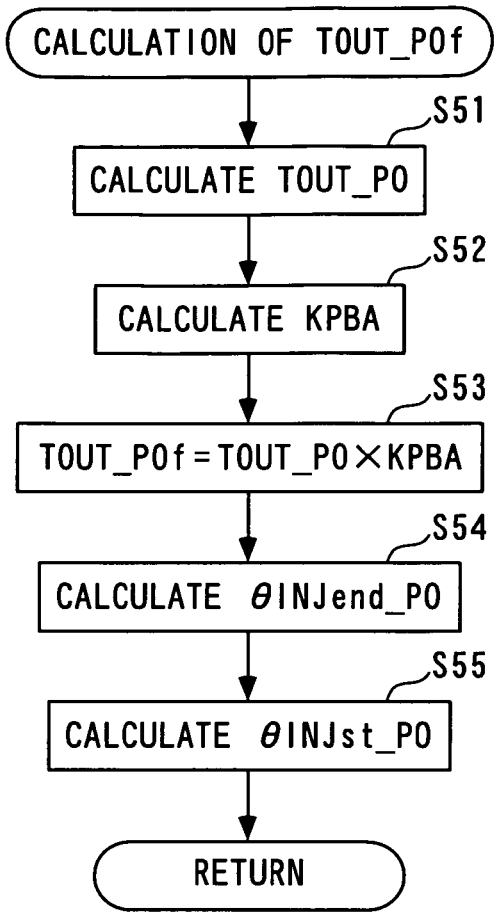
FIG. 12 is a flow chart showing a sub-routine of a TOUT_POf calculation process at step 26 in FIG. 5.

Turning back to FIG. 5, at step 26 subsequent to the aforementioned step 25, a port fuel injection time TOUT_POf is calculated, followed by the termination of this process. FIG. 12 shows a process for calculating the port fuel injection time TOUT_POf. First, at step 51, the basic port fuel injection time TOUT_PO is calculated by searching a TOUT_PO table (not shown) based on the port fuel injection amount GFPO calculated at the aforementioned step 24. This TOUT_PO table represents the relationship between a valve opening time of the port fuel injection valve 8 and the actual port injected fuel amount when the aforementioned port fuel pressure is at the reference port fuel pressure, and the intake pipe internal pressure PBA is at a predetermined reference intake pipe internal pressure PBAREF (for example, a value equivalent to the atmospheric pressure), which has been established by an experiment and represented in a tabular form. Also, in the TOUT_PO table, the basic port fuel injection time TOUT_PO is linearly set to a larger value as the port fuel injection amount GFPO is larger.

Figure 13:
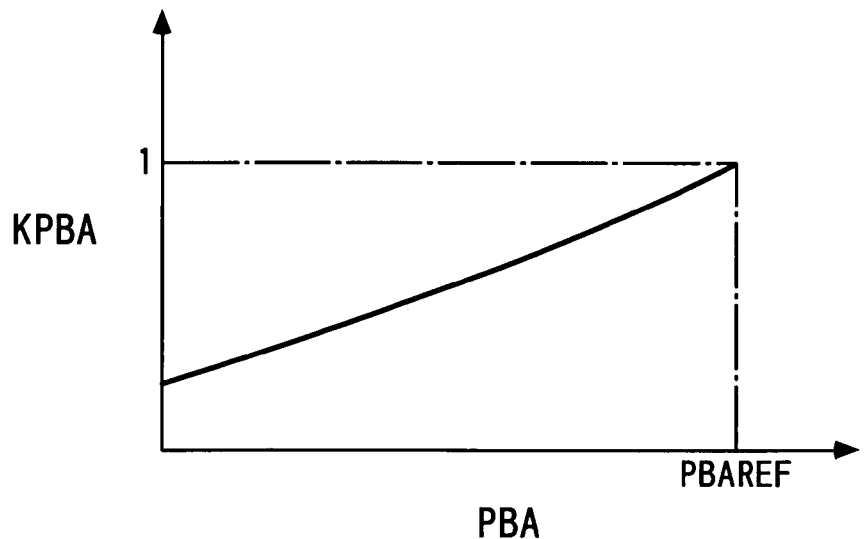
FIG. 13 is an example of a KPBA table used in the process of FIG. 12.

Next, an intake pipe internal pressure correction coefficient KPBA is calculated by searching a KPBA table shown in FIG. 13 in accordance with the intake pipe internal pressure PBA (step 52). This intake pipe internal pressure correction coefficient KPBA is provided for correcting the basis port fuel injection time TOUT_PO and calculating the port fuel injection time TOUT_POf. In this table, the intake pipe internal pressure correction coefficient KPPBA is set at the value of one when the intake pipe internal pressure PBA is at the aforementioned reference intake pipe internal pressure PBAREF, and is set to a larger value as the intake pipe internal pressure PBA is higher. This is intended to incrementally correct the basic port fuel injection time TOUT_PO because the actual port injected fuel amount is smaller as the intake pipe internal pressure PBA is higher for the same valve opening time of the port fuel injection valve 8.

Next, the basic port fuel injection time TOUT_P calculated at step 51 is multiplied by the intake pipe internal pressure correction coefficient KPBA calculated at step 52 to calculate the port fuel injection time TOUT_POf (step 53). Next, the port injection end timing θINJend_PO is calculated using the calculated port fuel injection time TOUT_POf (step 54), and the port injection start timing θINJst_PO is calculated (step 55), followed by the termination of this process.

The calculation of these port injection end timing θINJend_PO and port injection start timing θINJst_PO is performed in a manner similar to the calculation of the aforementioned in-cylinder injection end timing θINJend_DI and in-cylinder injection start timing θINJst_DI, respectively. Specifically, a map (not shown) is searched in accordance with the port fuel injection time TOUT_POf and the engine rotational speed NE to calculate the port injection end timing θINJend_PO. Also, the port fuel injection time TOUT_POf is converted to a crank angle in accordance with the engine rotational speed NE, and is subsequently subtracted from the port injection end timing θINJend_PO to calculate the port injection start timing θINJst_PO. IN this way, the port injection start/end timings θINJst_PO, θINJend_PO are calculated as timings during an intake stroke.

Further, driving signals based on the port injection start/end timings θINJst_PO, θINJend_PO are output to the port fuel injection valve 8. In this way, the valve opening/closing timings of the port fuel injection valve 8 are controlled to the calculated port injection start/end timings θINJst_PO, θINJend_PO, the valve opening time of the port fuel injection valve 8 is controlled to the port fuel injection time TOUT_PIF, and the actual port injected fuel amount is controlled to the port fuel injection amount GFPO.

As described above, according to this embodiment, the in-cylinder fuel injection time TOUT_DIf is calculated in accordance with not only the in-cylinder fuel injection amount GFDI but also the estimated cylinder internal pressure PCYLcent, thus making it possible to appropriately calculate the in-cylinder fuel injection time TOUT_DIf while compensating for the influence of the cylinder internal pressure on the actual in-cylinder injected fuel amount. Also, the port fuel injection time TOUT_POf is calculated in accordance with not only the port fuel injection amount GFPO but also the intake pipe internal pressure PBA, thus making it possible to appropriately calculate the port fuel injection time TOUT_POf while compensating for the influence of the intake pipe internal pressure PBA on the actual port injected fuel amount. From the foregoing, it is possible to accurately control the amounts of fuel supplied to the engine 3 from the in-cylinder fuel injection valve 6 and the port fuel injection valve 8 (hereinafter referred to as the "in-cylinder supplied fuel amount" and "port supplied fuel amount," respectively).

Also, since the estimated cylinder internal pressure PCYLcent which is the cylinder internal pressure generated during the basic injection period is used in the calculation of the in-cylinder fuel injection time TOUT_DIf, the in-cylinder fuel injection time TOUT_DIf can be appropriately calculated to be compatible with the actual cylinder internal pressure when the fuel is injected, thus making it possible to more accurately control the in-cylinder supplied fuel amount. Further, since the cylinder internal pressure generated at the intermediate timing θINJcent, i.e., an intermediate timing within the basic injection period, is used as the aforementioned estimated cylinder internal pressure PCYLcent, the in-cylinder fuel injection time TOUT_DIf can be appropriately calculated to be compatible with an average cylinder internal pressure when the fuel is injected, thus making it possible to further accurately control the in-cylinder supplied fuel amount. Also, since the in-cylinder fuel injection time TOUT_DIf is calculated in accordance with the in-cylinder fuel pressure PF, an appropriate in-cylinder fuel injection time TOUT_DIf can be calculated in accordance with the actual in-cylinder fuel pressure PF, thus making it possible to yet further accurately control the in-cylinder supplied fuel amount.

Further, the in-cylinder fuel injection amount GFDI for generating a stratified air-fuel mixture which serves as a torch is given a higher priority over the port fuel injection amount GFPO in the calculation in the torch self ignition combustion mode, operations based on the torch self ignition combustion mode can be appropriately accomplished. Also, since the in-cylinder fuel injection amount GFDI calculated in accordance with the engine rotational speed NE is used, the torch can be appropriately produced, thus making it possible to more appropriately perform the operations in the torch self ignition combustion mode.

It should be understood that the present invention is not limited to the embodiment described above, but can be practiced in a variety of manners. For example, while the foregoing embodiment estimates the cylinder internal pressure, the cylinder internal pressure may be detected by a sensor or the like, in which case the in-cylinder fuel injection time TOUT_DIf may be calculated, for example, in the following manner. First, the in-cylinder injection start timing θINJst_DI is calculated in accordance with the basic in-cylinder fuel injection time TOUT_DI, the basic in-cylinder injection end timing θINJendt_DI is calculated, and an intermediate timing between the in-cylinder injection start timing θINJst_DI and the basic in-cylinder injection end timing θINJendt_DI is calculated as the intermediate timing θINJcent. Next, the fuel injection is started at the in-cylinder injection start timing θINJst_DI, and subsequently, when the crank angle position CA reaches the intermediate timing θINJcent, the cylinder internal pressure correction coefficient KPCYL is calculated in accordance with the cylinder internal pressure detected at that time, and the in-cylinder fuel injection time TOUT-DIf is calculated.

Also, while the fuel pressure correction coefficient KPF, the cylinder internal pressure correction efficient KPCYL, and the intake pipe internal pressure correction coefficient KPBA are calculated through table searches, they may be calculated in accordance with equations. Further, the in-cylinder fuel injection time TOUT_DIf is calculated by first calculating the basic in-cylinder fuel injection time TOUT_DI based on the in-cylinder fuel injection amount GFDI, and correcting the calculated basic in-cylinder fuel injection time TOUT_DI using a variety of correction coefficients, but the in-cylinder fuel injection time TOUT_DIf may be directly calculated using an equation using the in-cylinder fuel injection amount GFDI, the in-cylinder fuel pressure PF, and the estimated cylinder internal pressure PCYLCENT. This is applied to the port fuel injection time TOUT_POf as well. Further, while the embodiment has shown an example in which the present invention is applied to the engine 3 for a vehicle, the present invention is not so limited, but can be applied to an engine for vessel propeller such as an outboard engine which has a crank shaft arranged in the vertical direction, and other internal combustion engines for industrial use. Otherwise, details in configuration can be modified as appropriate without departing from the spirit and scope of the invention set forth in the appended claims.

What is claimed is:

1. A fuel injection control apparatus for an internal combustion engine which is supplied with a fuel by an in-cylinder fuel injection vale for injecting the fuel into a cylinder, and a port fuel injection valve for injecting the fuel into an intake system including an intake port, said apparatus comprising:
    in-cylinder fuel injection amount calculating means for calculating an in-cylinder fuel injection amount which should be injected by said in-cylinder fuel injection valve;
    cylinder internal pressure acquiring means for acquiring a cylinder internal pressure which is the pressure within said cylinder;
    in-cylinder fuel injection time calculating means for calculating an in-cylinder fuel injection time which is a valve opening time of said in-cylinder fuel injection valve in accordance with the calculated in-cylinder fuel injection amount and the acquired cylinder internal pressure;
    in-cylinder fuel injection valve control means for controlling said in-cylinder fuel injection valve in accordance with the calculated in-cylinder fuel injection time;
    port fuel injection amount calculating means for calculating a port fuel injection amount which should be injected by said port fuel injection port;
    intake system internal pressure detecting means for detecting the pressure within said intake system;
    port fuel injection time calculating means for calculating a port fuel injection time which is a valve opening time of said port fuel injection valve in accordance with the calculated port fuel injection amount and the detected pressure within the intake system; and
    port fuel injection valve control means for controlling said port fuel injection valve based on the calculated port fuel injection time.

2. A fuel injection control apparatus for an internal combustion engine according to claim 1, further comprising:
    basic injection period setting means for setting a basic injection period of the fuel by said in-cylinder fuel injection valve in accordance with the in-cylinder fuel injection amount,
    wherein said in-cylinder fuel injection time calculating means uses the cylinder internal pressure which generates within the set basic fuel injection period as the cylinder internal pressure.

3. A fuel injection control apparatus for an internal combustion engine according to claim 1, further comprising:
    fuel pressure detecting means for detecting the pressure of the fuel supplied to said in-cylinder fuel injection valve,
    wherein said in-cylinder fuel injection time calculating means calculates the in-cylinder fuel injection time in accordance further with the detected pressure of the fuel.

4. A fuel injection control apparatus for an internal combustion engine according to claim 1, further comprising:
    load parameter detecting means for detecting a load parameter indicative of a load on said internal combustion engine;
    total required fuel calculating means for calculating a total required fuel amount in accordance with the detected load parameter; and
    rotational speed detecting means for detecting the rotational speed of said internal combustion engine,
    wherein said in-cylinder fuel injection amount calculating means calculates the in-cylinder fuel injection amount at least in accordance with the detected rotational speed of said internal combustion engine, and
    said port fuel injection amount calculating means calculates the port fuel injection amount by subtracting the in-cylinder fuel injection amount from the calculated total required fuel amount.

5. A fuel injection control method for an internal combustion engine which is supplied with a fuel by an in-cylinder fuel injection vale for injecting the fuel into a cylinder, and a port fuel injection valve for injecting the fuel into an intake system including an intake port, said method comprising the steps of:
    calculating an in-cylinder fuel injection amount which should be injected by said in-cylinder fuel injection valve;
    acquiring a cylinder internal pressure which is the pressure within said cylinder;
    calculating an in-cylinder fuel injection time which is a valve opening time of said in-cylinder fuel injection valve in accordance with the calculated in-cylinder fuel injection amount and the acquired cylinder internal pressure;
    controlling said in-cylinder fuel injection valve in accordance with the calculated in-cylinder fuel injection time;
    calculating a port fuel injection amount which should be injected by said port fuel injection port;
    detecting the pressure within said intake system;
    calculating a port fuel injection time which is a valve opening time of said port fuel injection valve in accordance with the calculated port fuel injection amount and the detected pressure within the intake system; and
    controlling said port fuel injection valve based on the calculated port fuel injection time.

6. A fuel injection control method for an internal combustion engine according to claim 5, further comprising the step of:
    setting a basic injection period of the fuel by said in-cylinder fuel injection valve in accordance with the in-cylinder fuel injection amount,
    wherein said step of calculating an in-cylinder fuel injection time includes using the cylinder internal pressure which generates within the set basic fuel injection period as the cylinder internal pressure.

7. A fuel injection control method for an internal combustion engine according to claim 5, further comprising the step of:
    detecting the pressure of the fuel supplied to said in-cylinder fuel injection valve, wherein said step of calculating an in-cylinder fuel injection time includes calculating the in-cylinder fuel injection time in accordance further with the detected pressure of the fuel.

8. A fuel injection control method for an internal combustion engine according to claim 5, further comprising the step of:

detecting a load parameter indicative of a load on said internal combustion engine;

calculating a total required fuel amount in accordance with the detected load parameter; and detecting the rotational speed of said internal combustion engine, wherein said step of calculating an in-cylinder fuel injection amount includes calculating the in-cylinder fuel injection amount at least in accordance with the detected rotational speed of said internal combustion engine, and said step of calculating a port fuel injection amount includes calculating the port fuel injection amount by subtracting the in-cylinder fuel injection amount from the calculated total required fuel amount.

* * * * *